(12) United States Patent
Zhu et al.

(10) Patent No.: US 9,523,591 B2
(45) Date of Patent: Dec. 20, 2016

(54) ENCODER AND ENCODING METHOD FOR SLIP RING

(71) Applicant: Nuctech Company Limited, Beijing (CN)

(72) Inventors: Yumin Zhu, Beijing (CN); Jinyu Zhang, Beijing (CN); Hui Ding, Beijing (CN); Hu Tang, Beijing (CN)

(73) Assignee: Nuctech Company Limited, Beijing (CN)

( * ) Notice: Subject to any disclaimer, the term of this patent is extended or adjusted under 35 U.S.C. 154(b) by 109 days.

(21) Appl. No.: 14/577,355

(22) Filed: Dec. 19, 2014

(65) Prior Publication Data

US 2015/0185053 A1    Jul. 2, 2015

(30) Foreign Application Priority Data

Dec. 26, 2013  (CN) .......................... 2013 1 0732682

(51) Int. Cl.
*G01D 5/24* (2006.01)
*G01D 5/347* (2006.01)
(Continued)

(52) U.S. Cl.
CPC ........ *G01D 5/3473* (2013.01); *G01D 5/24461* (2013.01); *G01D 5/24476* (2013.01); *H01R 39/08* (2013.01)

(58) Field of Classification Search
CPC .............. G01D 5/3473; G01D 5/24476; G05B 2219/33157
See application file for complete search history.

(56) References Cited

U.S. PATENT DOCUMENTS

| 5,329,114 A | 7/1994 | Fields |
| 5,585,924 A | 12/1996 | Schneider et al. |

(Continued)

FOREIGN PATENT DOCUMENTS

| CN | 1250257 A | 4/2000 |
| CN | 1892185 A | 1/2007 |

(Continued)

OTHER PUBLICATIONS

European Search Report from EP Application No. 14198143.1, dated Jul. 1, 2015, 8 pages.

(Continued)

*Primary Examiner* — Tony Ko
(74) *Attorney, Agent, or Firm* — Sterne, Kessler, Goldstein & Fox PLLC (57) ABSTRACT

Disclosed is an encoder and encoding method for slip ring. The encoder includes: an encoding belt that is fixed to a slip ring and has a plurality of holes regularly arranged on the encoding belt; at least one pair of first sensors provided on one side of the encoding belt, wherein the first sensors of each pair generate a first sense signal and a first redundant sense signal respectively based on light emitted from the other side of the encoding belt and passing through the plurality of holes, when the encoding belt rotates with the slip ring; and at least one signal combiner connected to the at least one pair of the first sensors, and configured to combine the first sense signal and the first redundant sense signal to obtain a combined sense signal as a first encoded signal. With embodiments of the present invention, a redundant signal is provided by using a redundant sensor, and it is possible to avoid interference of foreign substance, improve stability of encoded signals and ensure normal operation of equipment.

14 Claims, 4 Drawing Sheets

(51) Int. Cl.
*G01D 5/244* (2006.01)
*H01R 39/08* (2006.01)

(56) References Cited

U.S. PATENT DOCUMENTS

| | | | |
|---|---|---|---|
| 6,292,919 B1 | 9/2001 | Fries et al. | |
| 6,564,168 B1 | 5/2003 | Hasser | |
| 6,908,310 B1 * | 6/2005 | Olsson | H01R 39/08 |
| | | | 439/26 |
| 7,227,125 B2 | 6/2007 | Sannomiya et al. | |
| 7,439,489 B2 | 10/2008 | Sasaki et al. | |
| 2006/0267822 A1 * | 11/2006 | Ito | G01D 5/34746 |
| | | | 341/143 |

FOREIGN PATENT DOCUMENTS

| | | |
|---|---|---|
| CN | 101135578 A | 3/2008 |
| CN | 102519496 A | 6/2012 |
| CN | 203642942 U | 6/2014 |
| EP | 1547907 A1 | 6/2005 |
| JP | 0996545 A | 4/1997 |
| WO | WO 2013046117 A1 | 4/2013 |

OTHER PUBLICATIONS

International Search Report and Written Opinion from PCT/CN2014/094956, dated Mar. 31, 2015, 10 pages.
English translation of Written Opinion from PCT/CN2014/094956, dated Mar. 31, 2015, 2 pages.
English translation of Abstract from document FP8 EP1547907 (A1).

* cited by examiner

ENCODER AND ENCODING METHOD FOR SLIP RING

CROSS-REFERENCE TO RELATED APPLICATIONS

This application claims priority to the Chinese Patent Application No. 201310732682.0 filed on Dec. 26, 2013, the entire content of which is incorporated herein by reference in its entirety.

TECHNICAL FIELD

Example embodiments of the present invention generally relate to encoders, in particular, to encoder with redundant sensor and encoding method for slip ring.

BACKGROUND

Slip rings are widely used in equipment such as CT devices. An X ray source and detectors are generally secured onto a circular slip ring surrounding an object under detection. A sectional image of the detected object along the thickness direction is obtained as the slip ring rotates one round. In conventional CT devices, in order to obtain information of images from different view angles, it is required to rotate the slip ring and use information of location and rotation speed of the slip ring during its rotation. To this end, an encoder for slip ring has been designed. The main function of such encoder is to convert, through photoelectric encoding, the information of the location and rotation speed of the rotating slip ring into two orthogonal differential pulse signals with phases A and B, and a differential pulse signal with phase Z per rotation round, and transmit them to a host computer. The host computer analyzes the differential pulse signals with phases A, B and C to obtain the information of the location and rotation speed of the slip ring.

The accuracy and stability of the output signal from the encoder for slip ring are important to reliable and stable operation of the entire equipment. Having operated for certain time period, the coding belt of the encoder may have some holes partly or completely blocked due to, for example, accumulation of dust. This leads to output of erroneous differential pulse signals and abnormal control and operation of the equipment.

There is a need for an encoder and encoding method for slip ring, which can avoid or mitigate influence on output signals from partly or completely blocked holes, and improve operation stability of the entire equipment.

SUMMARY

Example embodiments of the present invention provide an encoder and encoding method for slip ring, which utilizes a redundant signal provided by a redundant sensor. It is possible to avoid external interference, and ensure accuracy and stability of signals output from the encoder.

According to an embodiment of the present invention, an encoder for slip ring is provided including: an encoding belt that is fixed to a slip ring and has a plurality of holes regularly arranged on the encoding belt; at least one pair of first sensors provided on one side of the encoding belt, wherein the first sensors of each pair generate a first sense signal and a first redundant sense signal respectively based on light emitted from the other side of the encoding belt and passing through the plurality of holes, when the encoding belt rotates with the slip ring; and at least one signal combiner connected to the at least one pair of the first sensors, and configured to combine the first sense signal and the first redundant sense signal to obtain a combined sense signal as a first encoded signal.

According to another embodiment of the present invention, an encoding method for slip ring is provided including the steps of: generating a first sense signal and a first redundant sense signal based on light passing through a plurality of holes regularly arranged on an encoding belt, when the encoding belt rotates with a slip ring; generating a combined sense signal by combining the first sense signal and the first redundant sense signal; and outputting the combined sense signal as a first encoded signal.

BRIEF DESCRIPTION OF THE DRAWINGS

Implementations of the present invention will be described in further detail below in connection with figures, in which.

DETAILED DESCRIPTION OF THE EMBODIMENTS

Example embodiments of the present invention will be illustrated in detail below in connection with figures. The description below comprises various specific details for assisting understanding, but these specific details should only be interpreted as exemplifying. Therefore, it will be appreciated by those ordinary skilled in the art that various alternations and modifications on respective embodiment depicted herein could be made without departing the scope and spirit of the present disclosure. Additionally, for the sake of clarity, illustration of well-known functionalities and structures will be omitted.

Terms and phrases used in the description below and in claims are not limited to their literal meanings, but only for clear understanding of implementation of the present invention. Therefore, it should be appreciated by those skilled in the art that the following description of respective example embodiments of the present invention is only provided for the purpose of illustration, but not intended to limit the present invention defined by appended claims and equivalents.

Figure 1:
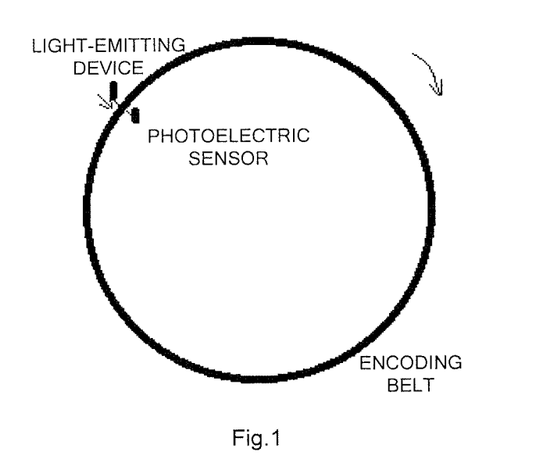
FIG. 1 illustrates a schematic diagram of arrangement of an encoder for slip ring.
Figure 2:
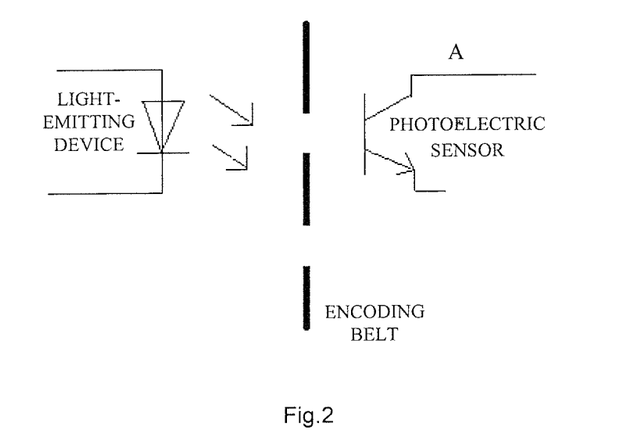
FIG. 2 illustrates an enlarged schematic diagram of part of the encoder in FIG. 1.

FIG. 1 illustrates a schematic diagram of arrangement of a conventional encoder for slip ring. FIG. 2 illustrates an enlarged schematic diagram of part of the encoder in FIG. 1. As shown in FIGS. 1 and 2, the encoder for slip ring includes an encoding belt, and a sensor arranged at one side of the encoding belt, such as a photoelectric sensor. The encoding belt may be, for example, a steel belt. The encoding belt is fixed to a slip ring and rotatable with the slip ring. A plurality of holes is regularly arranged on the encoding belt. Light emitted from a light emitting device, such as a light-emitting diode, arranged on the other side of the encoding belt passes through the holes on the encoding belt, and then is sensed by the sensor. The sensor may convert the sensed light signal into an electrical signal of a high or low level. In this way, as the encoding belt rotates with the slip ring, a light beam appears intermittently, and the sensed light signal is converted to an electrical signal or pulse associated with the rotation speed of the slip ring, and the frequency of the pulse is directly proportional to the rotation speed of the slip ring. The rotation speed and rotation direction of the slip ring can be determined from two orthogonal pulses, i.e. pulses of a 90 degree phase difference. Specifically, three sensors are provided, two of them generate two orthogonal differential pulse signals with phase A and B which represent the rotation speed and rotation direction of the slip ring, and the remaining sensor generates a pulse signal with phase Z per rotation which represents the count of rotations of the slip ring. The pulse signals with phase A, B and C are differentiated and transmitted to a host computer. The host computer analyzes the differential pulse signals with phase A, B and C to obtain information of the rotation location and rotation speed of the slip ring. As an example, FIG. 2 shows only part of an encoder corresponding to the pulse signal with phase A. The other parts of the encoder corresponding to the pulse signals with phase B and Z are similar.

Figure 3:
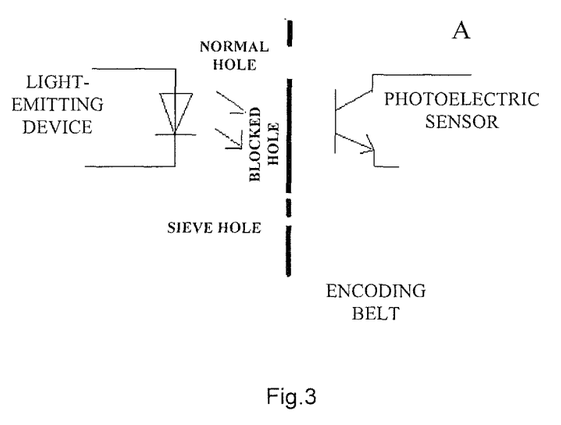
FIG. 3 illustrates a schematic diagram of an encoder for slip ring which suffers from interference.
Figure 4:
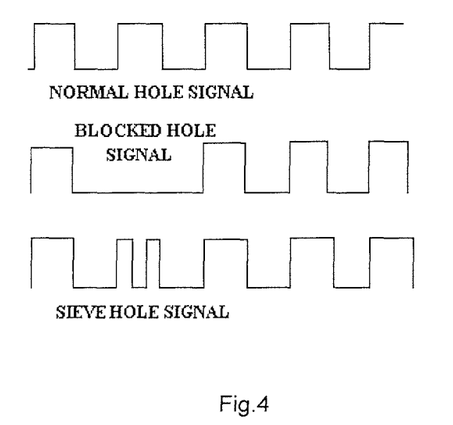
FIG. 4 illustrates output signal pulses of an encoder for slip ring which suffers from interference.

After a long time operation, some holes on the encoding belt of the encoder may be completely or partially blocked by foreign substance, such as dust. As shown in FIG. 3, there are thus blocked holes (i.e., completely blocked holes) and sieve holes (i.e., partially blocked holes) appearing on the encoding belt in addition to normal holes. The blocked and sieve holes lead to missing or dividing of one or more pulses of some phase. As shown in FIG. 4, taking phase A as an example, comparing with a signal for a normal hole, one pulse is missing in a signal for a blocked hole, and one pulse is divided into two parts in a signal for a sieve hole. As a result, phase error occurs in some sense signals. This leads to instability of output of the encoder, and function abnormality or failure of the entire equipment.

In view of the above problems with the conventional encoder for slip ring, an encoder and encoding method for slip ring is provided in embodiments of the present invention, which utilizes a redundant signal provided by a redundant sensor. This can avoid external interference, ensure accuracy and stability of signals output from the encoder, and thus normal and stable and operation of the entire equipment.

An encoder for slip ring according to an embodiment of the present invention includes an encoder belt, at least one pair of first sensors, and at least one signal combiners. The encoding belt is fixed to the slip ring, and has a plurality of holes regularly arranged on the encoding belt. The encoding belt may be, for example, a steel belt. At least one pair of the first sensors are provided on one side of the encoding belt. The first sensors of each pair are configured to generate a first sense signal and a first redundant sense signal, respectively, based on light emitted from the other side of the encoding belt and passing through the plurality of holes, as the encoding belt rotates with the slip ring. Each signal combiner is provided for each pair of the first sensors, and combines the first sense signal and the first redundant sense signal generated by the pair of the first sensors, to obtain a combined sense signal as a first encoded signal. In one embodiment, each combined sense signal may include a signal of phase A or B, that is, one of two single-phase electrical signals of orthogonal phases representing rotation speed and rotation direction of the slip ring.

In one embodiment, the encoder may further include at least one second sensor provided on the one side of the encoder. Each second sensor is configured to generate a second sense signal based on light emitted from the other side of the encoding belt and passing through the plurality of holes, as the encoding belt rotates with the slip ring. The second sense signal serves as a second encoded signal of the encoder. In one embodiment, the second encoded signal may include a signal of phase Z which is a single-phase electrical signal representing the count of rotations of the slip ring.

In one embodiment, in order to transmit the sense signal over a long distance, the encoder further includes a plurality of differentiators connected to the signal combiners and the second sensor respectively, and for converting each of the combined sense signals and the second sense signal into a differential signal to be transmitted as the first and second encoded signals. For example, the differentiators may utilize well-known differentiator chips.

In one embodiment, each of the first and second sensors may include a photoelectric sensor configured to sense light passing through the plurality of holes, and convert the sensed light signal into an electrical signal.

In one embodiment, two first sensors in each pair are provided along the encoding belt and spaced from each other by a predetermined distance, so that the sensors can generate the first sense signal and the first redundant sense signal having the same phase.

In one embodiment, the signal combiner includes a logical OR gate which performs an OR operation of the first sense signal and the first redundant sense signal.

Redundancy in sense signals at a phase can be achieved by using two sensors to generate two sense signals of the same phase. It is rare that foreign substance, such as dust, would block two holes just at the same phase or with a fixed distance between each other on the coding belt. Therefore, even when error occurs in a sense signal due to a blocked hole or a sieve hole, the error can be corrected or eliminated by a logical OR operation with the corresponding redundant sense signal. In this way, it is possible to avoid interference from foreign substance, ensure stability of the encoder output, and improve normality and reliability of operation of the equipment.

Figure 5:
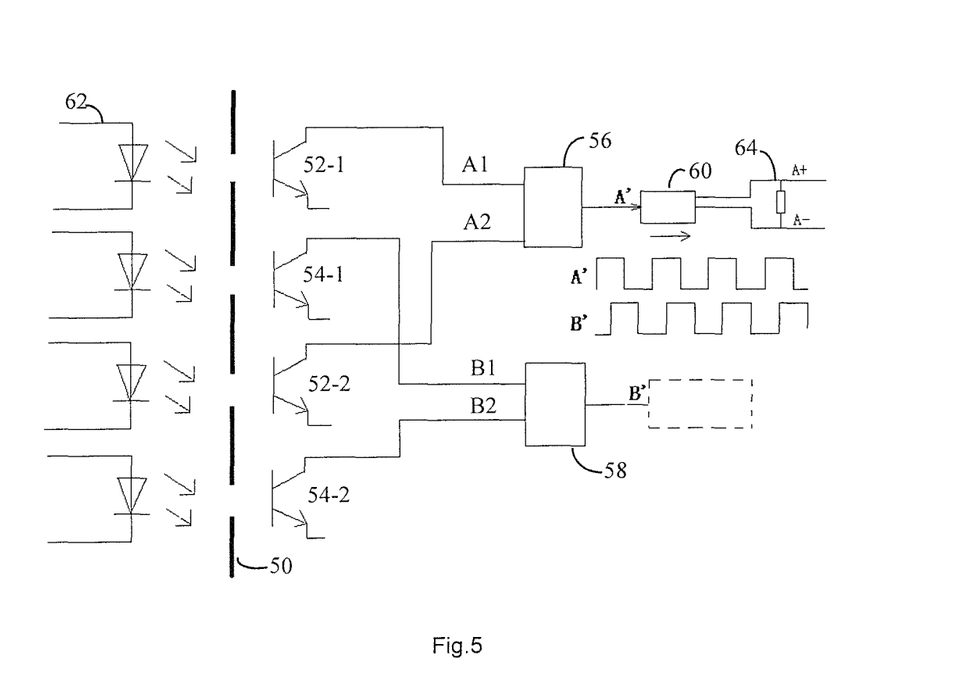
FIG. 5 illustrates an enlarged schematic diagram of part of an encoder for slip ring according to an example embodiment of the present invention.

FIG. 5 illustrates an enlarged schematic diagram of part of an encoder for slip ring according to an example embodiment of the present invention, taking phases A and B as example. As shown in FIG. 5, the encoder includes an encoding belt 50, two pairs of sensors 52-1, 52-2 and 54-1, 54-2 disposed on one side of the encoding belt 50, and signal combiners 56 and 58. The sensors 52-1, 52-2 for the phase A signal are disposed along the encoding belt 50 with a predetermined distance between each other, so as to generate a sense signal A1 and a redundant sense signal A2 which have the same phase (phase A). The sensors 54-1, 54-2 for the phase B signal are disposed along the encoding belt 50 with a predetermined distance between each other, so as to generate sensed a signal B1 and a redundant sense signal B2 which have the same phase (phase B). Phase A and phase B are orthogonal.

Specifically, as the encoding belt 50 rotates with the slip ring, light emitted from the light emitting device 62, such as a light-emitting diode, on the other side of the encoding belt 50 and passing through holes regularly arranged on the encoding belt 50, is sensed respectively by the sensors 52-1, 52-2 and 54-1, 54-2, and converted into electrical pulses A1 and A2 of phase A and electrical pulses B1 and B2 of phase B that are orthogonal to each other. The signal combiner 56 is connected to the sensors 52-1 and 52-2, receives electrical pulses A1 and A2 of phase A as input, combines them and outputs the combined electrical pulse A'. The signal combiner 58 is connected to the sensors 54-1 and 54-2, receives electrical pulses B1 and B2 of phase B as input, combines them and outputs the combined electrical pulse B'. The electrical pulses A' and B' are associated with the rotation speed of the slip ring, with their pulse frequency proportional to the rotation speed of the slip ring. Accordingly, the rotation speed and rotation direction of the slip ring can be determined from the two orthogonal pulses A' and B', i.e. pulses having a 90 degree phase difference. The signals A' and B', i.e. orthogonal encoded signal outputted from the encoder, may be transmitted to the host computer for processing to obtain the rotation speed and rotation direction of the slip ring.

In one embodiment, the signal combiners 56 and 58 may use logical OR gates.

Figure 6:
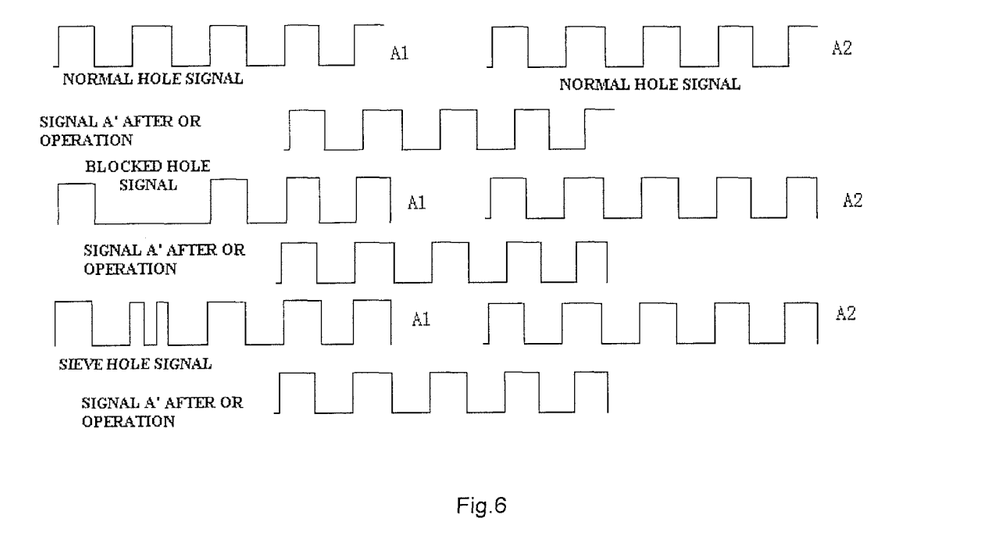
FIG. 6 illustrates electrical pulses outputted from sensors in an encoder for slip ring according to an example embodiment of the present invention.

FIG. 6 illustrates electrical pulses outputted from each pair of the sensors in an encoder for slip ring according to an example embodiment of the present invention. Specifically, it illustrates electrical pulses A1 and A2 of phase A outputted in cases of normal hole, blocked hole and sieve hole. Although electrical pulses of phase B are not shown, it may be appreciated by those skilled in the art that, except the phase difference, the waveform of electrical pulses B1 and B2 of phase B are similar to that of electrical pulses A1 and A2 of phase A in cases of normal hole, blocked hole and sieve hole.

As shown in the first two rows in FIG. 6, in the normal condition where the encoding belt is not affected by any foreign substance, the sensors 52-1 and 52-2 each generate normal-hole signals A1 and A2 which have the same normal waveform. The combined signal by the logical OR gate (i.e. signal A' after OR operation) also has the same normal waveform.

As shown in the middle two rows in FIG. 6, in a situation where some hole on the encoding belt has been completely blocked, such as the situation in FIG. 5 where the hole opposite to the sensor 52-1 has been completely blocked, the sensor 52-1 generates a blocked-hole signal A1 in which one pulse is missing. The hole opposite to the sensor 52-2 is not affected by any foreign substance, and thus the sensor 52-2 generates a normal-hole signal A2 with the same phase. The blocked-hole signal A1 and normal-hole signal A2 are combined by the logical OR gate. The signal A' after OR operation has the same waveform as that of the normal-hole signal A2, i.e. a normal waveform.

As shown in the last two rows in FIG. 6, in a situation where some hole on the encoding belt has been partially blocked and forms a sieve hole, such as the situation in FIG. 5 where the hole opposite to the sensor 52-1 has been partially blocked, the sensor 52-1 generates a sieve-hole signal A1 where one pulse is divided into several parts. The hole opposite to the sensor 52-2 is not affected by any foreign substance, and thus the sensor 52-2 generates a normal-hole signal A2 with the same phase. The sieve-hole signal A1 and normal-hole signal A2 are combined by the logical OR gate. The signal A' after OR operation has the same waveform as that of the normal-hole signal A2, i.e. a normal waveform.

As can be seen from FIG. 6, since it is rare that foreign substance would block two holes at the same phase or with fixed distance on the coding belt, even if an error occurs to a sense signal at a time point due to a blocked or sieve hole, such error can be corrected or eliminated by a logical OR operation with the corresponding redundant sense signal. Consequently, a correct signal of normal waveform can be obtained and signal stability can be ensured.

In one example, as shown in FIG. 5, in order to transmit the encoded signal A' over a long distance, the encoder further includes a differentiator 60 for converting the signal A' into differential signals A+ and A−. The differentiator 60 may use a well-known differentiator chip.

Although not shown in FIG. 5, a differentiator identical to the differentiator 60 may be used for converting the signal B' to generate differential signals B+ and B− for transmission. In FIG. 5, a dash box is shown to indicate that the same arrangement as that for the signal A' is omitted.

In one embodiment, the differential signals A+ and A− and differential signals B+ and B− may be each outputted via a DB9 plug. FIG. 5 illustrates a DB9 plug 64 which includes a terminal resistance, and outputs DB9-6, and DB9-1.

Although not shown in FIG. 5, in order to obtain the count information of rotations of the slip ring, a sensor for generating a signal of phase Z is also disposed on the one side of the encoding belt, and a hole for generating a signal of phase Z is also provided on the encoding belt. With the hole, a pulse with phase Z is output each time the slip ring rotates for one round. The pulse of phase Z is used to calculate the rotation speed and location of the slip ring in connection with the signals of phase A and B. Like the signals of phase A and B, the signal of phase Z is also converted into differential signals by a differentiator for output.

Figure 7:
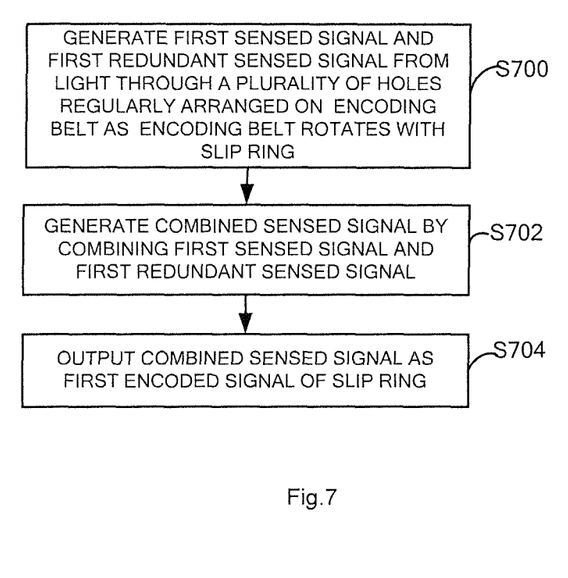
FIG. 7 illustrates a schematic flow chart of an encoding method for slip ring according to an example embodiment of the present invention.

The structure and operation of the encoder for slip ring have been described above in connection with the example embodiments. An encoding method for slip ring according to an example embodiment of the present invention will be described in connection with FIG. 7. As shown in FIG. 7, the encoding method includes step S700 where a first sense signal and a first redundant sense signal are generated from light passing through a plurality of holes regularly disposed on the encoding belt, as the encoding belt rotates with the slip ring.

In step S702, a combined sense signal is generated by combining the first sense signal and the first redundant sense signal. The combined sense signal may include one or both of two single-phase electrical signals of orthogonal phases, such as signal A' and/or B' shown in FIG. 5, which represent the rotation speed and rotation direction of the slip ring. The combination of the first sense signal and the first redundant sense signal may by implemented by performing an OR operation on the signals.

In step 704, the combined sense signal is outputted to the host computer as a encoded signal for processing to obtain the rotation speed and location of the slip ring.

Although not shown in FIG. 7, the encoding method may also include generating a second sense signal as a second encoded signal of the slip ring from the light passing through the plurality of holes, as the encoding belt rotates with the slip ring. The second encoded signal may include a single-phase electrical signal, i.e. a signal of phase Z, which represents the count of rotations of the slip ring.

Although not shown in FIG. 7, the encoding method may also include converting the combined sense signal and the second sense signal into differential signals respectively for transmission.

The above detailed description has illustrated various embodiments of an encoder and encoding method for slip ring in schematic diagrams, flow charts and/or examples. In cases that these schematic diagrams, flow charts and/or examples includes one or more functionalities and/or operations, it should be appreciated by those skilled in the art that each functionality and/or operation in these schematic diagrams, flow charts and/or examples can be separately and/or collectively achieved by various structures, hardware, software, firmware or substantially any of their combinations. In one embodiment, several components of subject matters of embodiments of the present invention may be implemented by an application specific integrated circuit (ASIC), Field Programmable Gate Array (FPGA), Digital Signal Processor (DSP), or other integrated format. However, it should be appreciated by those skilled in the art that all or part of some aspects of embodiments discloses herein may be equivalently implemented in integrated circuits, implemented as one or more computer programs executed on one or more computers (for example, implemented as one or more programs executed on one or more computer systems), implemented as one or more programs executed on one or more processors (for example, implemented as one or more programs executed on one or more micro-processors), implemented as firmware, or substantially implemented as any combinations of the above described methods, and those skilled in the art will have the ability of designing circuits and/or writing-in software and/or firmware codes based on the present disclosure. Additionally, it will be appreciated by those skilled in the art that subject matters of the present disclosure can be distributed as various types of program products, and example embodiments of the subject matters of the present disclosure will always be applicable regardless of the specific type of signal carrying medium for implementing distribution. Examples of the signal carrying medium include, but is not limited to: recordable medium, such as flexible disks, hard drives, compact disk (CD), Digital Versatile Disk (DVD), digital cassettes, computer memories, etc.; and transmission medium, such as digital and/or analog communications medium, for example, fiber optical cable, waveguide, wired communications link, wireless communications link, etc.

Although the present invention has been described with reference to several typical embodiments, it should be appreciated that terms used herein are illustrative and exemplifying, but not limiting. Since the present invention can be specifically implemented in various ways without departing the spirit and substance of the invention, it should be appreciated that the above described embodiments are not limited to any of above described details, but should be widely explained within the spirit and scope defined by appended claims. Consequently, all of the alternations and modifications falling into the scope of claims or the equivalents thereof are covered by appended claims.

What is claimed is:

1. An encoder for slip ring, comprising:
    an encoding belt that is fixed to a slip ring and has a plurality of holes regularly arranged on the encoding belt;
    at least one pair of first sensors provided on one side of the encoding belt, wherein the first sensors of each pair generate a first sense signal and a first redundant sense signal respectively based on light emitted from the other side of the encoding belt and passing through the plurality of holes, when the encoding belt rotates with the slip ring; and
    at least one signal combiner connected to the at least one pair of the first sensors, and configured to combine the first sense signal and the first redundant sense signal to obtain a combined sense signal as a first encoded signal;
    wherein the first two sensors of each pair are provided along the encoding belt and spaced from each other by a preset distance, so as to generate the first sense signal and the first redundant sense signal having the same phase.

2. The encoder of claim 1, further comprising:
    at least one second sensor provided on one side of the encoder, wherein each of the second sensor generates a second sense signal, as a second encoded signal, based on light emitted from the other side of the encoding belt and passing through the plurality of holes, when the encoding belt rotates with the slip ring.

3. The encoder of claim 2, further comprising:
    a plurality of differentiators connected to the at least one signal combiner and the at least one second sensor respectively, and configured to convert each of the combined sense signal and the second sense signal into a differential signal for transmission.

4. The encoder of claim 2, wherein the second sense signal comprises a single-phase electrical signal representing the count information of rotations of the slip ring.

5. The encoder of claim 1, wherein each of the first and second sensors comprises a photoelectric sensor configured to sense light passing through the plurality of holes, and to convert a sensed light signal into an electrical signal.

6. The encoder of claim 1, wherein the at least one pair of the first sensors comprises two pairs of the first sensors,
    the first sense signal and the first redundant sense signal generated by each pair of the first sensors are associated with a rotation speed of the slip ring.

7. The encoder of claim 6, wherein the at least one signal combiner comprises two signal combiners connected to the two pairs of the first sensors, respectively; and
    the two signal combiners generate two combined sense signals comprising two single-phase electrical signals that have orthogonal phases and represent the rotation speed and rotation direction of the slip ring.

8. The encoder of claim 1, wherein the signal combiner includes a logical OR gate that performs an OR operation of the first sense signal and the first redundant sense signal.

9. An encoding method for slip ring, comprising the steps of:
    generating, by at least one pair of first sensors provided on one side of an encoding belt, a first sense signal and a first redundant sense signal based on light passing through a plurality of holes regularly arranged on the encoding belt, when the encoding belt rotates with a slip ring;
    generating a combined sense signal by combining the first sense signal and the first redundant sense signal; and
    outputting the combined sense signal as a first encoded signal;
    wherein the first two sensors of each pair are provided along the encoding belt and spaced from each other by a preset distance, so as to generate the first sense signal and the first redundant sense signal having the same phase.

10. The encoding method of claim 9, further comprising:
    generating a second sense signal, as a second encoded signal, based on the light emitted from the other side of the encoding belt and passing through the plurality of holes, when the encoding belt rotates with the slip ring.

11. The encoding method of claim 10, further comprising:
    converting the combined sense signal and the second sense signal into a differential signal for transmission.

12. The encoding method of claim 10, wherein the step of combining the first sense signal and the first redundant sense signal further comprises:
 performing an OR operation of the first sense signal and the first redundant sense signal.

13. The encoding method of claim 10, wherein the second sense signal comprises a single-phase electrical signal representing count information of rotations of the slip ring.

14. The encoding method of claim 9, wherein the combined sense signal comprises at least one of two single-phase electrical signals that have orthogonal phases and represent rotation speed and rotation direction of the slip ring.

* * * * *